US007678880B2

(12) United States Patent
Kimizuka et al.

(10) Patent No.: US 7,678,880 B2
(45) Date of Patent: Mar. 16, 2010

(54) MOLECULAR ORIENTED POLYMER GEL AND CAST FILM WITH SELF-ORGANIZABLE AMPHIPHILIC COMPOUND AS TEMPLATE, AND THEIR PRODUCTION METHODS

(75) Inventors: Nobuo Kimizuka, 701, 1-11 Kashihama 4-chome, Higashi-ku, Fukuoka-shi, Fukuoka-ken (JP); Kazuhiro Kagawa, Wako (JP); Takuya Nakashima, Nara-ken (JP)

(73) Assignees: Honda Giken Kogyo Kabushiki Kaisha, Tokyo (JP); Nobuo Kimizuka, Fukuoka-shi (JP)

( * ) Notice: Subject to any disclaimer, the term of this patent is extended or adjusted under 35 U.S.C. 154(b) by 1171 days.

(21) Appl. No.: 10/524,079

(22) PCT Filed: Aug. 7, 2003

(86) PCT No.: PCT/JP03/10068

§ 371 (c)(1),
(2), (4) Date: Oct. 31, 2005

(87) PCT Pub. No.: WO2004/014965

PCT Pub. Date: Feb. 19, 2004

(65) Prior Publication Data

US 2006/0102876 A1    May 18, 2006

(30) Foreign Application Priority Data

Aug. 8, 2002  (JP) ............................. 2002-231958
Jan. 22, 2003  (JP) ............................. 2003-013943

(51) Int. Cl.
*C08G 75/00* (2006.01)
*C08G 75/32* (2006.01)
*C08G 73/06* (2006.01)
*C08G 73/00* (2006.01)
*B01J 13/00* (2006.01)
*C09K 19/00* (2006.01)
*C09K 19/56* (2006.01)

(52) U.S. Cl. ........................ 528/378; 528/377; 528/380; 528/391; 528/423; 528/367; 528/368; 516/102; 516/103; 516/900; 428/1.2; 252/299.01; 252/299.2

(58) Field of Classification Search ................. 528/423, 528/380, 378, 367, 368, 391; 252/299.2
See application file for complete search history.

(56) References Cited

U.S. PATENT DOCUMENTS 6,017,390 A * 1/2000 Charych et al. ............... 117/68

(Continued)

FOREIGN PATENT DOCUMENTS

JP          2-308811          2/1990

(Continued)

OTHER PUBLICATIONS

Cheung et al, Molecular Organization and Electrical Properties of Mixed Langmuir-Blodgett Multilayer Thin Films of Polypyrrole, 1990, Conjugated Polymeric Materials, Bredas and Chance (eds), p. 91-99.*

(Continued)

*Primary Examiner*—Randy Gulakowski
*Assistant Examiner*—Rachel Kahn
(74) *Attorney, Agent, or Firm*—Lahive & Cockfield, LLP; Anthony A. Laurentano; Brian C. Trinque (57) ABSTRACT

A molecular-oriented polymer gel and its cast film obtained by self-assembly of a self-organizable amphiphilic compound and a monomer interacting with the amphiphilic compound, and then polymerizing the monomer, and their production methods.

5 Claims, 7 Drawing Sheets

200 nm

U.S. PATENT DOCUMENTS 6,210,537 B1 * 4/2001 Murphy et al. ......... 204/157.15
6,576,679 B2 * 6/2003 Kimizuka et al. ........... 516/102

FOREIGN PATENT DOCUMENTS

| JP | 02-238029 | 9/1990 |
| JP | 94041532 B2 * | 6/1994 |
| JP | 263874 | 9/1994 |
| JP | 07-015718 | 4/1995 |
| JP | 9-299868 A | 11/1997 |
| JP | 2002-5887 A | 1/2002 |
| JP | 2002-085957 | 3/2002 |

OTHER PUBLICATIONS

Kimizuka et al, AFM Observation of Organogel Nanostructures on Graphite in the Gel-Assisted Transfer Technique, Chemistry Letters, 1998, p. 967-68.*

* cited by examiner

MOLECULAR ORIENTED POLYMER GEL AND CAST FILM WITH SELF-ORGANIZABLE AMPHIPHILIC COMPOUND AS TEMPLATE, AND THEIR PRODUCTION METHODS

RELATED APPLICATIONS

This application is a 35 U.S.C. 371 national stage filing of International Application No. PCT/JP2003/010068, filed 7 Aug. 2003, which claims priority to Japanese Patent Application No. 2002-231958 filed on 8 Aug. 2002 and Japanese Patent Application No. 2003-013943 filed 22 Jan. 2003 in Japan. The contents of the aforementioned applications are hereby incorporated by reference.

FIELD OF THE INVENTION

The present invention relates to a molecular-oriented polymer gel and its cast film obtained by using a self-organizable amphiphilic compound as a template, and their production methods, and particularly to a molecular-oriented polymer gel and its cast film having high electrical conductivity as well as excellent mechanical strength and molecular orientation, and their production methods.

BACKGROUND OF THE INVENTION

Soft materials typically exemplified by polymer gels have been developed as novel materials having peculiar electrical characteristic, morphological properties (phase transition, etc.), flexibility, etc., and much attention is recently paid to applications to gel actuators having controllability of electrochemical driving, among others. From this standpoint of view, it is desired to provide the polymer gel with excellent electrical conductivity. However, methods using conventional polymers have technological limitations in improvement in electrical conductivity. It is thus required to control the structure of the polymer gel, namely its molecular orientation, at a nano-level, particularly at a molecular level.

As a method for providing a polymer with molecular orientation, JP 7-105718 A discloses a method for producing a molecular complex comprising a polyelectrolyte and a conductive polymer, which comprises combining a polyelectrolyte functioning as a template and a monomer to form a template complex, and subjecting the monomer to oxidation polymerization by an oxidant. In this method, however, the molecular orientation of the resultant polymer is determined by the structure of a polyelectrolyte functioning as a template, failing to control the molecular orientation of the polymer at a nano-level, particularly at a molecular level.

Attempts have also been made to provide the self-organized-to-molecular-level body with orientation by the self-organization of a low-molecular-weight compound therein. In this method, the structure and properties of the self-organized-to-molecular-level body can be accurately controlled at a nano-level, particularly at a molecular level by optimizing the molecular structure of the low-molecular-weight compound, temperature and solvents for self-organizing the low-molecular-weight compound, etc.

JP 2002-85957 A discloses a method for producing a molecular-oriented hydrogel experiencing phase transition depending on a temperature by self-organizing a cationic amphiphilic compound and an anionic compound interacting with it. In this method, however, each molecule in the hydrogel is not polymerized, failing to obtain sufficient mechanical strength.

In addition, for use as materials for thin display devices, etc., development has been conducted to provide cast polymer films having excellent molecular orientation due to the self-organization of the above low-molecular-weight compounds. JP 2-238029 A discloses a method for producing a cast polymer film having excellent molecular orientation and mechanical strength, which comprises mixing a radically polymerizable monomer and a synthetic lipide capable of forming a two-molecule membrane, casting the resultant dispersion on a substrate, drying it to form a laminate film, polymerizing the monomer in the laminate film, and extracting the synthetic lipide.

This synthetic lipide has a structure represented, for instance, by the following formula (III):

(III)

Though the cast polymer film comprising this synthetic lipide has a multi-layered bilayer membrane in lamellar structure, the radically polymerizable monomer represented, for instance, by $CH_2\!=\!CRCOO(CH_2CH_2O)_n COC\!=\!CRH_2$, wherein n is 2 to 20, entering between the layers does not have a π-conjugated structure exhibiting redox activity. Accordingly, it is considered that this cast polymer film fails to exhibit excellent electrical conductivity.

OBJECT OF THE INVENTION

Accordingly, an object of the present invention is to provide a molecular-oriented polymer gel and its cast film having excellent mechanical strength and molecular orientation and high electrical conductivity, and methods for producing them.

DISCLOSURE OF THE INVENTION

As a result of intensive research in view of the above object, the inventors have paid attention to the fact that when an amphiphilic compound having a hydrophobic part and a hydrophilic part is self-organized, it grows to have a fibrous structure, thereby forming a gel, which is self-organized at a molecular level, finding that the self-organization of an amphiphilic compound and a monomer interacting with it at a molecular level and the polymerization of the monomer can provide a polymer gel and a cast polymer film having excellent molecular orientation and mechanical strength and high electrical conductivity. The present invention has been completed based on these findings.

Thus, the molecular-oriented polymer gel of the present invention is obtained by self-organizing a self-organizable amphiphilic compound and a monomer interacting with the amphiphilic compound, and then polymerizing the monomer.

The molecular-oriented polymer cast film according to the first embodiment of the present invention is obtained by casting a solution of a self-organizable amphiphilic compound and a monomer interacting with the amphiphilic compound, and then polymerizing the monomer.

The molecular-oriented polymer cast film according to the second embodiment of the present invention is obtained by casting a solution of an amphiphilic compound on an electrode, and then supplying current to the electrode in a solution containing a monomer which is thiophene and/or its derivative, to electrochemically polymerize the monomer.

In the above molecular-oriented polymer gel and cast polymer film, the amphiphilic compound is preferably a cation comprising a linear or branched alkyl group having 20 or less carbon atoms. The cation is preferably represented by the following general formula (I):

wherein $R_1$ and $R_2$ represent linear or branched alkyl groups having 20 or less carbon atoms, which may be the same or different, or by the following general formula (II):

wherein $R_3$ and $R_4$ represent linear or branched alkyl groups having 20 or less carbon atoms, which may be the same or different, and n represents an integer of 2 to 12. Particularly when the monomer is an anionic monomer such as a monomer containing a sulfonic group, a linear or branched alkyl group of the amphiphilic compound preferably has 10 or less carbon atoms.

Preferable as the above monomers are thiophene and/or its derivative, pyrrole and/or its derivative, or other anionic monomers than the thiophene derivative and the pyrrole derivative. Preferable as the thiophene derivative is at least one selected from the group consisting of 3-thiophencarboxylic acid, 3-thiophenacetic acid, 3-thiophene ethanol, 3,4-ethylenedioxythiophene and bis(thiophene). Preferable examples of the pyrrole derivatives include 3-pyrrolecarboxylic acid, 3-pyrroleacetic acid, etc. Preferable examples of the anionic monomers include monomers having sulfonic acid such as 2-acrylamide-2-methylpropanesulfonic acid, 3-thiophencarboxylic acid, 3-thiophenacetic acid, etc. As described above, 3-thiophencarboxylic acid is usable as an anionic monomer, though it is a thiophene derivative.

The method for producing a molecular-oriented polymer gel according to the present invention comprises the steps of mixing a self-organizable amphiphilic compound and a monomer to self-organize them, and then polymerizing the monomer.

The method for producing a molecular-oriented polymer cast film according to the first embodiment of the present invention comprises the steps of preparing a solution of a self-organizable amphiphilic compound and a monomer interacting with the amphiphilic compound, casting the solution, and then polymerizing the monomer.

The method for producing a molecular-oriented polymer cast film according to the second embodiment of the present invention comprises the steps of casting a solution of an amphiphilic compound on an electrode, dried the solution to form a film, immersing the film on the electrode in a monomer solution, and supplying current to the electrode to electrochemically polymerize the monomer.

In both methods, the polymerization reaction of the monomer is preferably carried out at a temperature lower than a phase transition temperature of a self-organized-to-molecular-level body of the amphiphilic compound and the monomer.

BEST MODE FOR CARRYING OUT THE INVENTION

[1] Molecular-Oriented Polymer Gel

(1) Composition (A) Amphiphilic Compound

The amphiphilic compound used in the present invention is composed of a hydrophobic part and a hydrophilic part. The amphiphilic compound is preferably a cation having a linear or branched alkyl group having 20 or less carbon atoms in the hydrophobic part, and particularly preferably a compound represented by the following general formula (I):

Preferred specific examples of the cationic amphiphilic compounds include those having the following formulae (IV) to (VI), though cationic amphiphilic compounds used in the present invention are not restricted thereto.

The amphiphilic compound used in the present invention may be represented by the following general formula (II):

wherein $R_3$ and $R_4$ represent alkyl groups having 20 or less carbon atoms, which may be the same or different, and n represents an integer of 2 to 12. In the general formula (II), n is preferably 4 to 10.

(B) Monomer

The monomer interacting with the above amphiphilic compound to form a self-organized-to-molecular-level body should be polymerized to produce a molecular-oriented polymer having a fibrous structure, which is not precipitated. Accordingly, it is preferable to use as the above monomer thiophene and/or its derivatives, or other anionic monomers than the thiophene derivatives.

(i) Anionic Monomer

The anionic monomer used in the present invention is preferably an anionic monomer having a sulfonic group, more preferably 2-acrylamide-2-methylpropanesulfonic acid. In addition, 3-thiophencarboxylic acid, 3-thiophenacetic acid, etc. may be used as the anionic monomer.

(ii) Thiophene and its Derivatives

Thiophene and its derivatives used in the present invention include thiophene, 3-thiophencarboxylic acid, 3-thiophenacetic acid, 3-thiophene ethanol, 3,4-ethylenedioxythiophene and bis(thiophene), etc. Thiophene and its derivatives may be used alone or in combination. The use of thiophene and/or its derivative provides the resultant molecular-oriented polymer gel with excellent electrical conductivity. As described above, 3-thiophencarboxylic acid may also be used as an anionic monomer.

(2) Properties of Molecular-Oriented Polymer Gel

The molecular-oriented polymer gel of the present invention can be produced by self-organizing a self-organizable amphiphilic compound and a monomer interacting with the amphiphilic compound, and then polymerizing the monomer. Because the preferred amphiphilic compound of the present invention has at least two hydrophobic groups, there is hydrophobic interaction between the molecules, making it easy for overall molecules to aggregate with orientation. Further, because the amphiphilic compound has three amide groups, an aggregate of the amphiphatic compound is interacted with each other via hydrogen bonding between the amide groups, easily forming a network structure. In addition, because the preferred amphiphilic compound of the present invention is a cation, while the preferred monomer is an anion, there is electrostatic attraction between them, so that the monomer is interacted with the amphiphilic compound and thus aggregated with orientation. The polymerization of the monomer in this state can provide a polymer, which conventionally has no or extremely low molecular orientation, with molecular orientation.

Because the monomer is polymerized, the molecular-oriented polymer gel of the present invention has high mechanical strength. The molecular-oriented polymer gel undergoes a reversible gel-to-sol phase transition at a phase transition temperature of the self-organized-to-molecular-level body obtained from the amphiphilic compound and the monomer. Accordingly, the polymer gel of the present invention can have a structure and properties controlled at a nano-level, particularly at a molecular level, through the chemical structures (molecular orientation) of constituent molecules and the morphological properties (phase transition, etc.) of the polymer gel.

The use of thiophene and/or its derivatives as the monomer provides the resultant molecular-oriented polymer gel with excellent electrical conductivity because of excellent redox activity of thiophene and/or its derivatives.

In a case where a sulfonic-group-containing monomer is used as the monomer, if the linear or branched alkyl group of the amphiphilic compound has more than 10 carbon atoms, the self-organization of the amphiphilic compound and the sulfonic-group-containing monomer fails to form a self-organized-to-molecular-level body having a fibrous structure, resulting in the likelihood that the product is aggregated and precipitated. Accordingly, the sulfonic-group-containing monomer is preferably combined with an amphiphilic compound having a linear or branched alkyl group having 10 or less carbon atoms. On the other hand, when thiophene and/or its derivatives are used as the monomer, the number of carbon atoms in a linear or branched alkyl group of the amphiphilic compound may be 20 or less, not restricted to 10 or less.

[2] Molecular-Oriented Polymer Cast Film

The molecular-oriented polymer cast film may be the same as the molecular-oriented polymer gel except for casting a solution of an amphiphilic compound and a monomer interacting with it. Thought not particularly restricted, the thickness of the cast polymer film is preferably 100 to 1000 µm, for instance, in the application of electrically conductive actuators.

[3] Production Method of Molecular-Oriented Polymer Gel

The self-organizable amphiphilic compound and the monomer interacting with it are mixed in water or in an organic solvent to self-organize the amphiphilic compound and the monomer, and the monomer is then polymerized. The organic solvents are preferably chloroform, toluene, cyclohexane, chlorocyclohexane, acetonitrile, etc. Monomer-polymerizing methods are not particularly restrictive, but usual polymer-synthesizing methods such as polymerization methods using initiators, methods using the irradiation of ultraviolet rays, etc., may be used.

The concentration of the amphiphilic compound in the solution of the amphiphilic compound and the monomer is preferably 5 to 50 mM, more preferably 10 to 20 mM. The concentration of the monomer is preferably 0.5 to 50 mol, for instance, 1 mol, per 1 mol of the amphiphilic compound.

The polymerization reaction of the monomer is conducted preferably at a temperature lower than a phase transition temperature of a self-organized-to-molecular-level body of the amphiphilic compound and the monomer, usually at about 50 to 80° C. When the compound of the formula (IV) as the amphiphilic compound and 2-acrylamide-2-methylpropanesulfonic acid as the monomer are used, for instance, the polymerization temperature is preferably lower than 63.5° C. When the polymerization temperature is above the phase transition temperature of the self-organized-to-molecular-level body, the aggregation and precipitation of the self-organized-to-molecular-level body occur, failing to obtain a molecular-oriented polymer gel having a fibrous structure.

[4] Production Method of Molecular-Oriented Polymer Cast Film (1) First Production Method The self-organizable amphiphilic compound and the monomer interacting with it are mixed in water or in an organic solvent, and the resultant solution is cast on a substrate such as a glass plate, etc., and dried. Thereafter, the monomer is polymerized by immersion in a solution containing a polymerization initiator, to form a molecular-oriented polymer cast film. To maintain the self-organization of the self-organized-to-molecular-level body in the solution, it is preferable to evaporate a solvent slowly by leaving the solution cast on the substrate to stand at room temperature or slightly heating it. The polymerization conditions of the monomer may be the same as in the case of the molecular-oriented polymer gel.

(2) Second Production Method

A solution of a self-organizable amphiphilic compound is prepared, cast on an electrode, and then dried to form a cast film. The concentration of the amphiphilic compound solution is preferably 5 to 50 mM, more preferably 10 to 20 mM. The thickness of the cast film is not particularly restrictive as long as it functions as a working electrode in a current-supplying process described below, though it is generally about 50 to 1000 nm.

A solution of the monomer, which is thiophene and/or its derivative, is prepared. The concentration of a monomer solution is preferably 100 to 2000 mol per 1 mol of the amphiphilic compound. Solvents are preferably acetonitrile, water, etc. A supporting electrolyte such as tetrabutylammonium tetrafluoroborate, tetrabutylammonium perchlorate, etc. is preferably dissolved in the monomer solution.

The cast film on the electrode is charged into the monomer solution, and current is supplied such that the electrode (cast film) is an anode. A cathode is preferably a platinum electrode, and a reference electrode is preferably Ag/AgCl, etc. Applied voltage need only be a potential, at which the electrolytic polymerization of the monomer occurs, or more. The electrolytic polymerization may be constant-potential electrolysis or constant-current electrolysis, or may be carried out simultaneously with the cyclic voltammetry (CV) measurement while changing the potential. In the case of the constant-potential electrolysis, applied voltage is preferably about +800 to +2000 mV. The cyclic voltammetry is preferably carried out at a potential of about −1000 to +2000 mV, and at a scanning speed of about 10 to 500 mV/second. The application of voltage electrolytically polymerizes the monomer in the solution on the cast film and/or in the cast film, thereby forming the molecular-oriented polymer cast film.

The present invention will be described in more detail below with reference to Examples without intention of restricting the scope of the present invention.

EXAMPLE 1

2 mL of an aqueous solution containing 20 mM of a compound represented by the following formula (IV):

was mixed with 2 mL of an aqueous solution containing 20 mM of sodium 2-(acrylamido)-2-methylpropane sulfonate, to form a self-organized-to-molecular-level body. To identify the resultant self-organized-to-molecular-level body, its $^1$H-NMR was measured under the following conditions:

Resolution: 600 MHz,

Compound: Amphiphatic compound of the formula (IV) and sodium 2-(acrylamido)-2-methylpropane sulfonate, Solvent: d-methanol, and Measurement temperature: 25° C.

Figure 1:
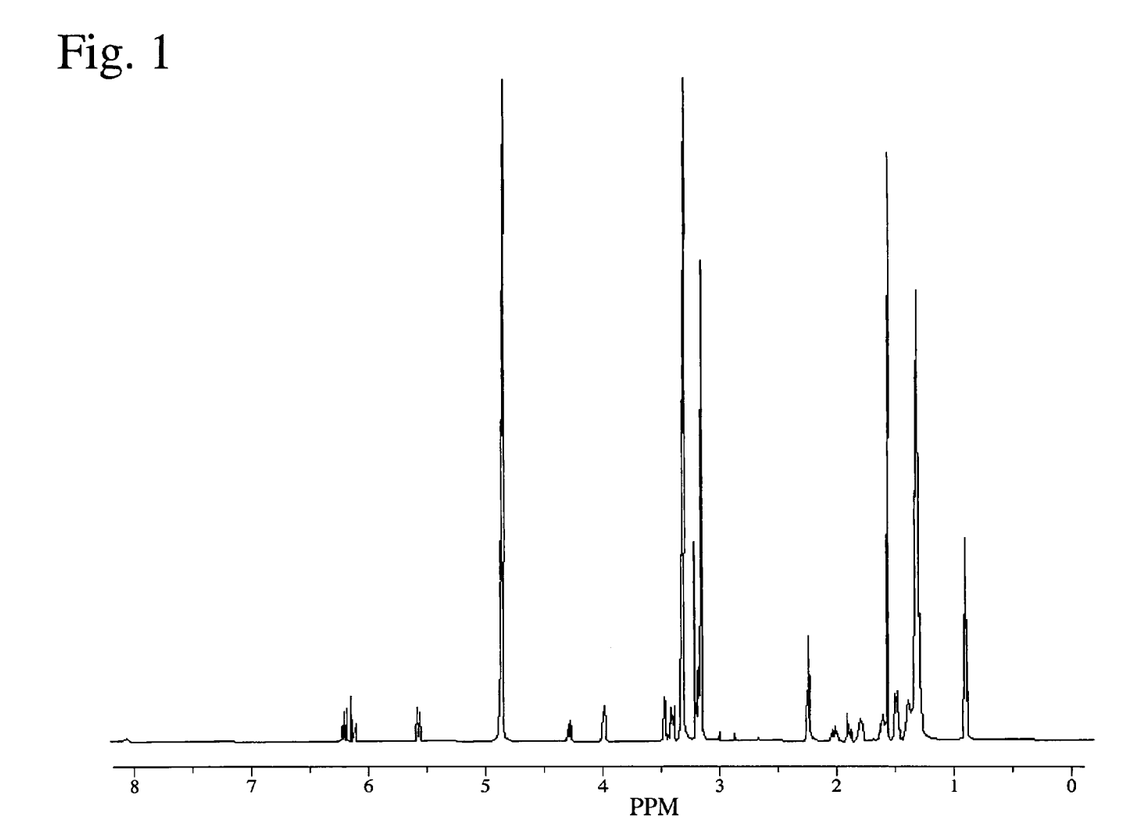
FIG. 1 is a graph showing a $^1$H-NMR spectrum of the self-organized-to-molecular-level body of Example 1.

The results are shown in FIG. 1.

Figure 2:
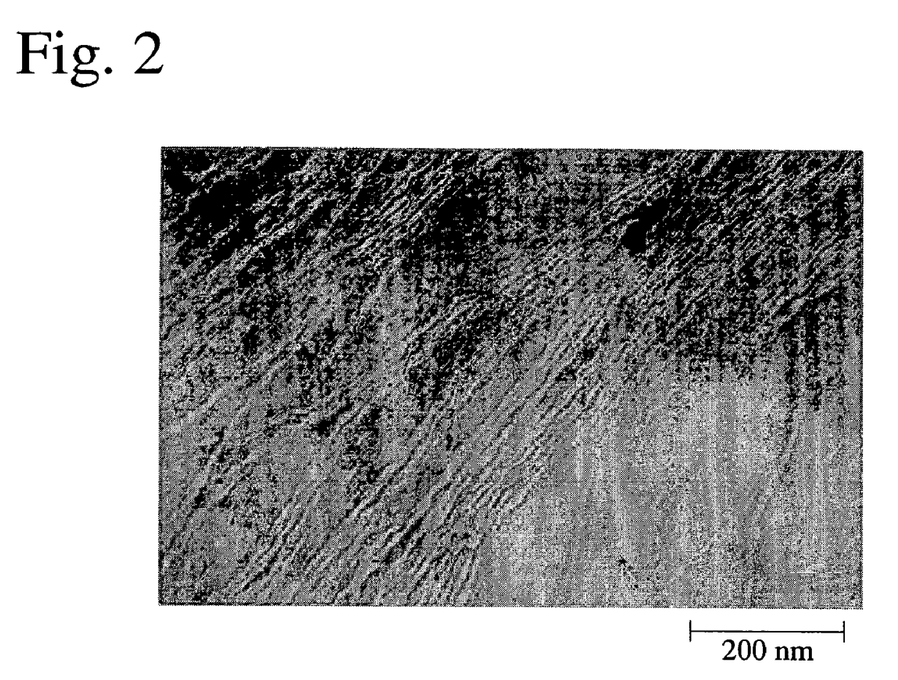
FIG. 2 is a transmission electron photomicrograph showing the self-organized-to-molecular-level body of Example 1.

Part of the above self-organized-to-molecular-level body was collected, diluted to 1 mM, and observed by a transmission electron microscope. Its transmission electron photomicrograph is shown in FIG. 2.

Figure 3:
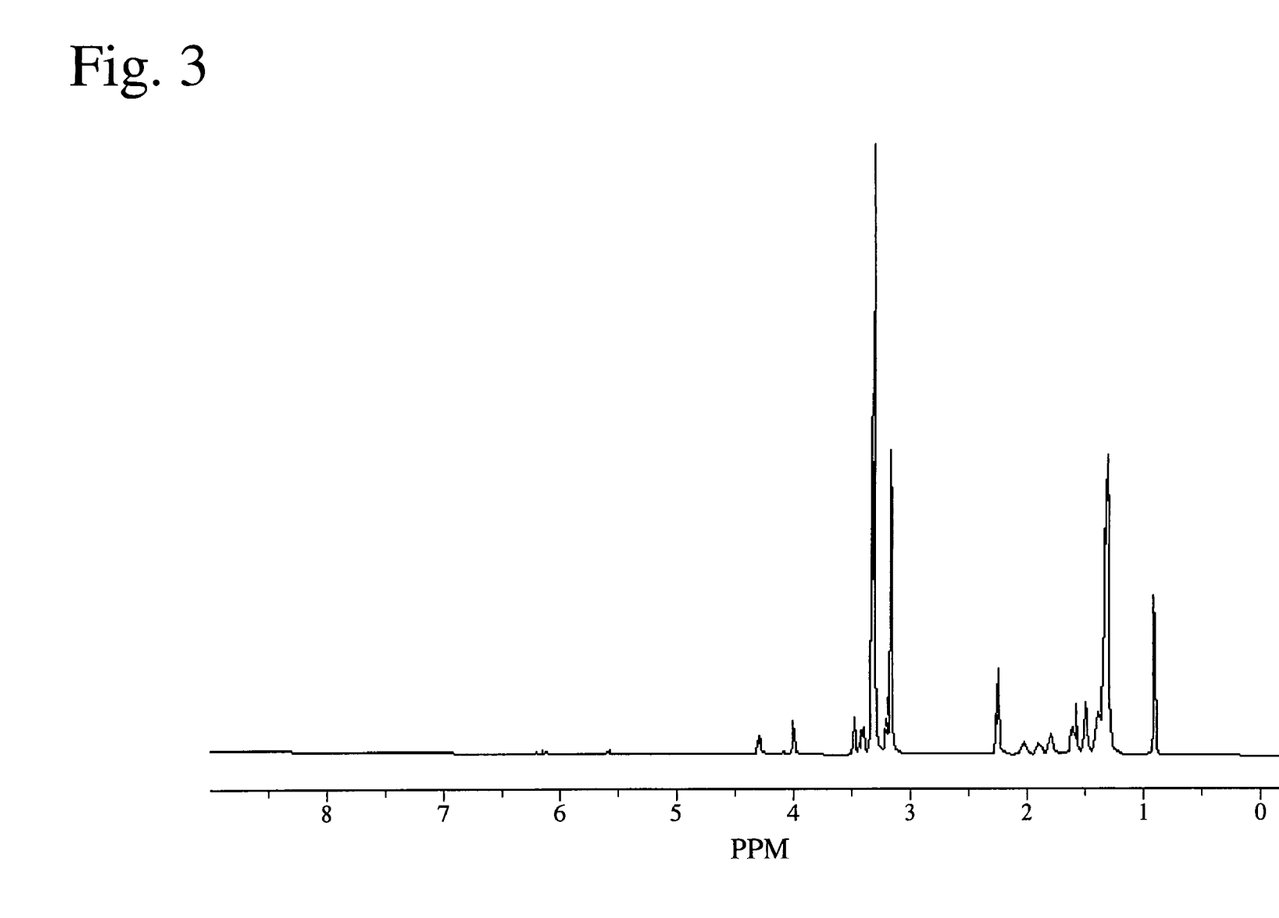
FIG. 3 is a graph showing a $^1$H-NMR spectrum of the molecular-oriented polymer gel of Example 1.
Figure 4:
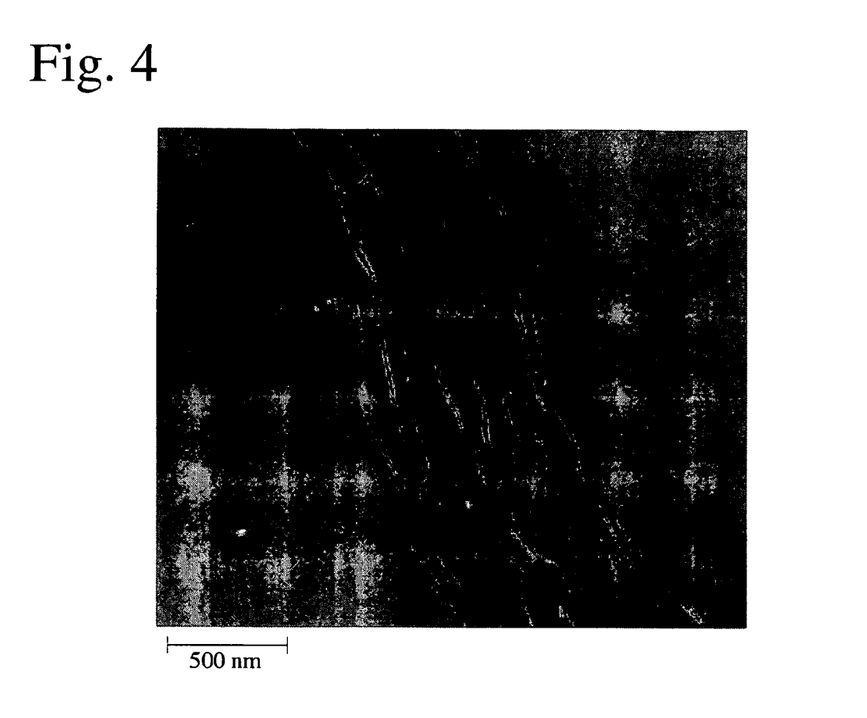
FIG. 4 is a transmission electron photomicrograph showing the molecular-oriented polymer gel of Example 1.

The resultant self-organized-to-molecular-level body was mixed with an aqueous solution containing 5 mM of potassium persulfate as a polymerization initiator, and left to stand at 50° C., lower than the phase transition temperature (63.5° C.) of the self-organized-to-molecular-level body, for 12 hours. To identify the resultant polymer, its $^1$H-NMR was measured. The results are shown in FIG. 3. The conditions of $^1$H-NMR measurement are the same as those before the polymerization. Part of the above polymer was collected, diluted to 1 mM and observed by a transmission electron microscope. Its transmission electron photomicrograph is shown in FIG. 4.

It was confirmed from the $^1$H-NMR charts (FIGS. 1 and 3) that peaks (5.5 to 6.5 ppm) of vinyl protons in 2-acrylamide-2-methylpropanesulfonic acid in the self-organized-to-molecular-level body before adding the polymerization initiator substantially disappeared after adding the polymerization initiator. It is clear from the transmission electron photomicrographs of FIGS. 2 and 4 that fibrous agglomerates of 10 to 45 nm in diameter were bundled to form a network structure after adding the polymerization initiator, likewise before adding the polymerization initiator. It was confirmed from these results that the polymer was in the form of a gel having high molecular orientation.

EXAMPLE 2

Figure 5:
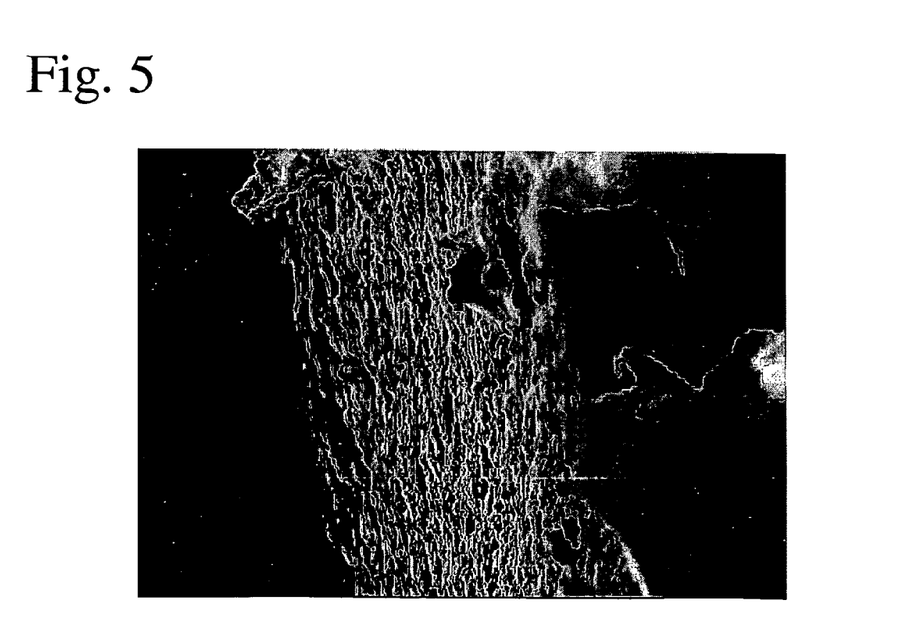
FIG. 5 is a scanning electron photomicrograph showing a cross section of the molecular-oriented polymer cast film of Example 2.

20 mM of a compound represented by the following formula (VI):

and 20 mM of 3-thiophenacetic acid were dissolved in chloroform, and the resultant solution was cast on a glass substrate and then dried at room temperature to form a white cast film. This white film was immersed in a solution of 50 mM of FeCl$_3$ in diethyl ether as a polymerization initiator for about 1 hour to polymerize 3-thiophenacetic acid, thereby obtaining a black film. This black film was washed with ion-exchanged water to provide a brown cast polymer film. Part of the brown cast polymer film was collected, to observe its cross section by a scanning electron microscope. Its scanning electron photomicrograph is shown in FIG. 5. It was confirmed from FIG. 5 that the cast polymer film had a cross section in a laminar structure.

EXAMPLE 3

A compound of the formula (VI) and 3-thiophenacetic acid were respectively dissolved in acetonitrile to prepare solutions having a concentration of 20 mM. 0.25 mL of each solution was mixed with each other and heated to prepare a solution of a self-organized-to-molecular-level body. This self-organized-to-molecular-level body solution was cast on an ITO film (surface resistance: 60Ω) on a glass substrate of 1.0 cm×3.0 cm, to form a gel. This gel attached to the substrate was placed in a dish, and immersed in 5 mL of a solution of $FeCl_3$ (100 mM) in acetonitrile introduced into the dish. In the gel immersed in a solution of $FeCl_3$ in acetonitrile, 3-thiophenacetic acid was polymerized, and the compound (VI) and an unreacted monomer were eluted from the gel into the solution. As a result, the gel on the substrate was turned to a red cast film of poly(3-thiophenacetic acid).

Figure 6:
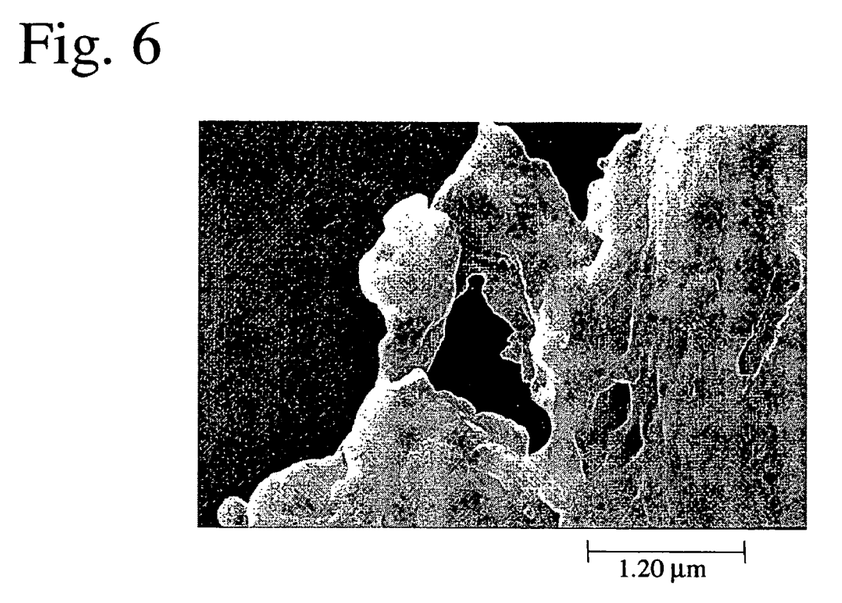
FIG. 6 is a scanning electron photomicrograph showing the cast polymer film of Example 3.
Figure 7:
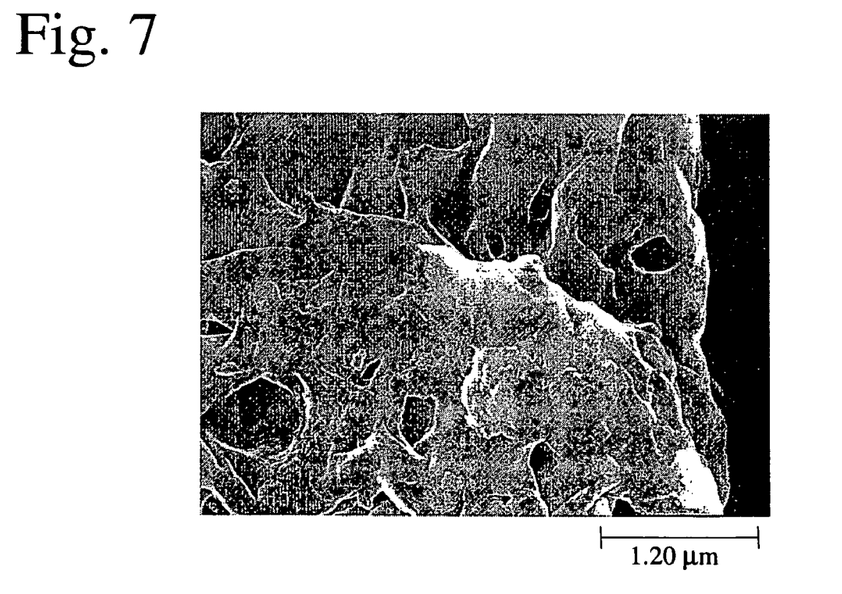
FIG. 7 is a scanning electron photomicrograph showing the cast polymer film of Example 3.

The cast polymer film on the ITO film on the glass substrate was dried under reduced pressure. After vapor-depositing platinum onto the resultant sample, its cross section was observed by a scanning electron microscope. As shown in FIGS. 6 and 7, it was found that an amorphous, filmy cast polymer gel of poly(3-thiophenacetic acid) was attached.

Figure 8:
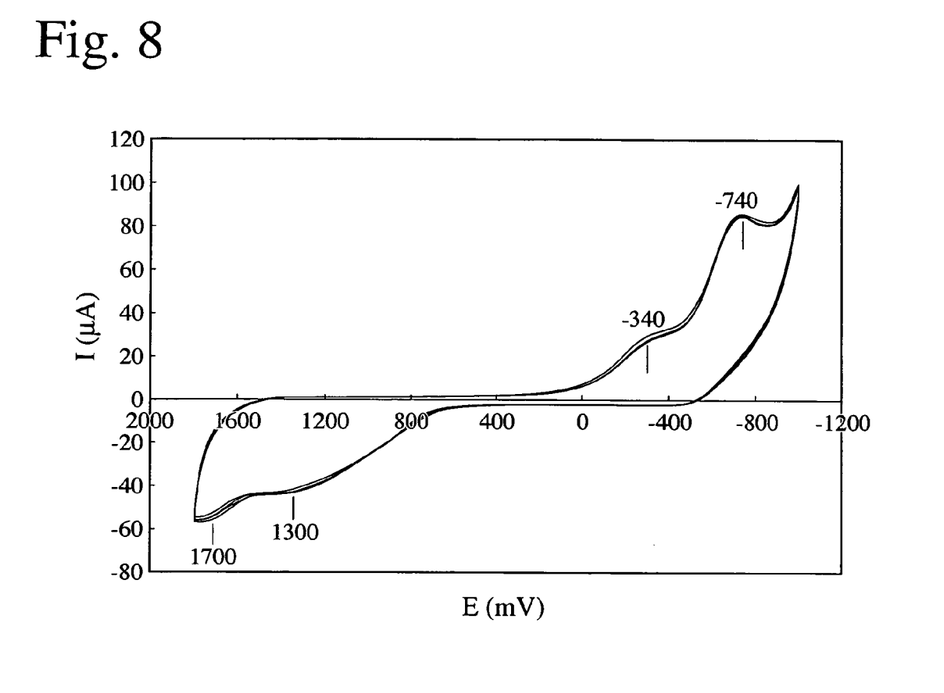
FIG. 8 is a graph showing cyclic voltammetry (CV) curves of the cast polymer film of Example 3 formed on an ITO film.

With the ITO film as an anode, the platinum electrode as a cathode, and Ag/AgCl as a reference electrode, the redox properties of the cast polymer film was examined by cyclic voltammetry (CV) (voltage: +1800 mV to −1000 mV, scanning speed: 100 mV/s, 5 cycles) in a solution of tetrabutylammonium tetrafluoroborate (concentration: 0.1 M) in acetonitrile. The resultant C-V curves are shown in FIG. 8. Reversible oxidation-reduction waves derived from poly(3-thiophenacetic acid) were observed (reduction wave: −340 mV, −740 mV, oxidation wave: +1300 mV, +1700 mV). It was found from this result that the molecular-orientable cast film of poly(3-thiophene) in this Example had good redox properties.

EXAMPLE 4

0.5 mL of an aqueous solution containing 10 mM of a compound represented by the following formula (VII):

was cast on an ITO film (surface resistance: 60Ω) on a glass substrate of 1.0 cm×3.0 cm, and dried at room temperature to form a cast film.

Figure 9:
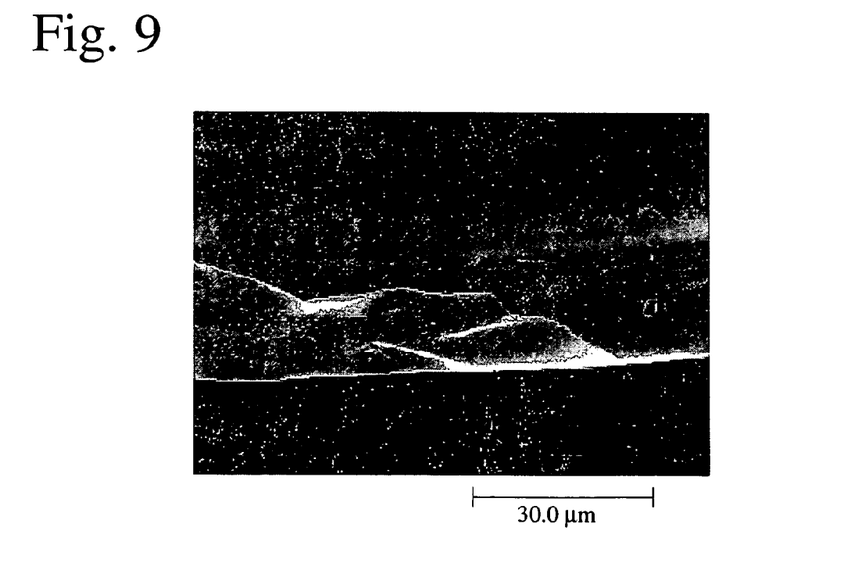
FIG. 9 is a scanning electron photomicrograph showing the molecular-oriented polymer cast film of Example 4.
Figure 10:
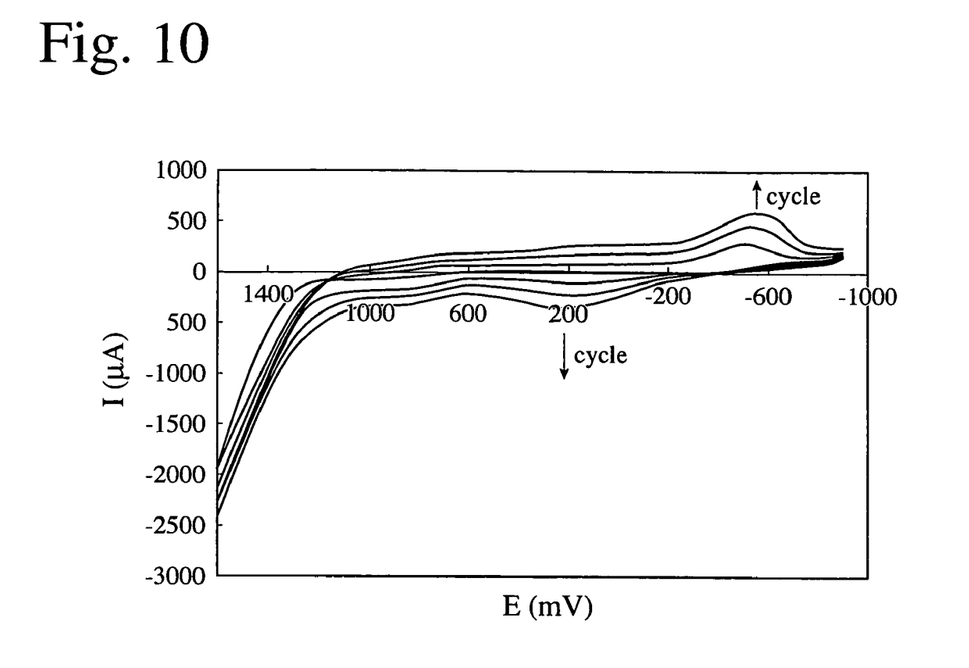
FIG. 10 is a graph showing CV curves of the molecular-oriented polymer cast film of Example 4 formed on an ITO film.

With the ITO film as an anode, a platinum electrode as a cathode, and Ag/AgCl as a reference electrode, cyclic voltammetry (CV) measurement (voltage: +1600 mV to −900 mV, scanning speed: 100 mV/s, 3 cycles) was conducted in a solution of 3,4-ethylenedioxythiophene (concentration: 20 M) as a monomer and tetrabutylammonium tetrafluoroborate (concentration: 0.1 M) as a supporting electrolyte in acetonitrile. As a result, the electrolytic polymerization of 3,4-ethylenedioxythiophene proceeded, resulting in a black molecular-oriented polymer cast film as shown in FIG. 9, likewise in Example 2. The resultant C-V curves are shown in FIG. 10. It was found from FIG. 10 that there was increase in an oxidation peak (+200 mV) and a reduction peak (−570 mV) of the polymer occurring by the electrolytic polymerization, and that the molecular-oriented polymer cast film of this Example had good redox properties.

COMPARATIVE EXAMPLE 1

1.5 mL of an aqueous solution containing 10 mM of a compound represented by the following formula (III):

was mixed with 1.5 mL of an aqueous solution containing 10 mM of poly(sodium 2-(acrylamido)-2-methylpropane sulfonate) available from Sigma-Aldrich Company at 25° C. As a result, aggregation and precipitation occurred immediately.

APPLICABILITY IN INDUSTRY

As described above, the molecular-oriented polymer gel and cast film of the present invention have excellent mechanical strength and molecular orientation, high electric conductivity and good redox properties. Accordingly, it can be expected to use the molecular-oriented polymer gel of the present invention for actuators, etc. Also, it can be expected to use the molecular-oriented polymer cast film of the present invention for thin display devices, etc. by forming on electrodes.

(VII)

What is claimed is:

1. A molecular-oriented polymer gel obtained by self-assembly of a self-organizable amphiphilic compound and a monomer interacting with said amphiphilic compound, and then polymerizing said monomer, said amphiphilic compound being represented by the following general formula (I):

(I)

wherein $R_1$ and $R_2$ represent linear or branched alkyl groups having 20 or less carbon atoms, which may be the same or different.

2. The molecular-oriented polymer gel according to claim 1, wherein said monomer is thiophene and/or its derivative, pyrrole and/or its derivative, or 2-acrylamide-2-methylpropanesulfonic acid, or another anionic monomer than said thiophene derivative and said pyrrole derivative.

3. The molecular-oriented polymer gel according to claim 2, wherein said anionic monomer comprises a sulfonic group.

4. The molecular-oriented polymer gel according to claim 3, wherein said anionic monomer is 2-acrylamide-2-methyl-propanesulfonic acid.

5. The molecular-oriented polymer gel according to claim 2, wherein said thiophene derivative is at least one selected from the group consisting of 3-thiophencarboxylic acid, 3-thiophenacetic acid, 3-thiophene ethanol, 3,4-ethylenedioxythiophene and bis(thiophene), and wherein said pyrrole derivative is 3-pyrrolecarboxylic acid or 3-pyrroleacetic acid.

* * * * *